United States Patent
Kim et al.

(10) Patent No.: US 10,928,645 B2
(45) Date of Patent: Feb. 23, 2021

(54) THREE-DIMENSIONAL IMAGE DISPLAY APPARATUS AND IMAGE PROCESSING METHOD

(71) Applicant: SAMSUNG ELECTRONICS CO., LTD., Suwon-si (KR)

(72) Inventors: Yuntae Kim, Suwon-si (KR); Geeyoung Sung, Daegu (KR); Changkun Lee, Seoul (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/249,434

(22) Filed: Jan. 16, 2019

(65) Prior Publication Data

US 2020/0033615 A1    Jan. 30, 2020

(30) Foreign Application Priority Data

Jul. 30, 2018    (KR) .................. 10-2018-0088671

(51) Int. Cl.
| | |
|---|---|
| *G02B 30/40* | (2020.01) |
| *G06T 7/50* | (2017.01) |
| *G06T 7/20* | (2017.01) |
| *G03H 1/16* | (2006.01) |
| *G03H 1/08* | (2006.01) |
| *G09G 3/00* | (2006.01) |

(52) U.S. Cl.
CPC .............. *G02B 30/40* (2020.01); *G03H 1/08* (2013.01); *G03H 1/16* (2013.01); *G06T 7/20* (2013.01); *G06T 7/50* (2017.01); *G09G 3/003* (2013.01); *G03H 2210/30* (2013.01)

(58) Field of Classification Search
CPC . G02B 30/40; G03H 1/16; G03H 1/08; G03H 2210/30; G03H 1/0808; G03H 1/22; G03H 2210/454; G09G 3/003; G09G 2340/16; G09G 2360/16; G06T 7/20; G06T 7/50
USPC ....................................................... 345/419
See application file for complete search history.

(56) References Cited

U.S. PATENT DOCUMENTS

| | | | |
|---|---|---|---|
| 9,304,319 B2 | 4/2016 | Bar-Zeev et al. | |
| 9,392,218 B2 | 7/2016 | Guo et al. | |

(Continued)

FOREIGN PATENT DOCUMENTS

| | | |
|---|---|---|
| KR | 10-2017-0032736 A | 3/2017 |
| KR | 10-1717379 B1 | 3/2017 |

OTHER PUBLICATIONS

Hu, X. and Hua, H., "High-resolution optical see-through multi-focalplane head-mounted display using freeform optics", May 30, 2014, Optics Express, vol. 22, Issue 11, 8 pages total.

(Continued)

*Primary Examiner* — Ke Xiao
*Assistant Examiner* — Kim Thanh T Tran
(74) *Attorney, Agent, or Firm* — Sughrue Mion, PLLC

(57) ABSTRACT

A three-dimensional (3D) image display apparatus includes a processor configured to determine, from image data of a 3D image to be displayed, a representative depth value based on a current frame of the 3D image and a previous frame of the 3D image, and an imaging optical system configured to generate the 3D image in a predetermined space by modulating light based on the representative depth value.

20 Claims, 21 Drawing Sheets

(56) References Cited

U.S. PATENT DOCUMENTS

| | | | |
|---|---|---|---|
| 9,443,316 B1* | 9/2016 | Takeda | G06T 7/11 |
| 9,576,399 B2 | 2/2017 | Lo et al. | |
| 9,726,891 B2 | 8/2017 | Webster et al. | |
| 9,892,545 B2 | 2/2018 | Benko et al. | |
| 2005/0190972 A1* | 9/2005 | Thomas | G06K 9/209 |
| | | | 382/218 |
| 2007/0053059 A1* | 3/2007 | Gugel | G02B 21/0024 |
| | | | 359/386 |
| 2010/0208040 A1* | 8/2010 | Guillou | H04N 13/128 |
| | | | 348/51 |
| 2011/0134114 A1* | 6/2011 | Rais | H04N 13/254 |
| | | | 345/419 |
| 2013/0101176 A1* | 4/2013 | Park | G06T 7/50 |
| | | | 382/106 |
| 2013/0127989 A1* | 5/2013 | Chen | G06T 7/579 |
| | | | 348/43 |
| 2014/0206443 A1* | 7/2014 | Sharp | A63F 13/00 |
| | | | 463/31 |
| 2014/0211286 A1* | 7/2014 | Nam | G03H 1/0808 |
| | | | 359/9 |
| 2014/0267602 A1* | 9/2014 | Tzur | H04N 13/122 |
| | | | 348/43 |
| 2015/0104101 A1* | 4/2015 | Bryant | G06T 7/507 |
| | | | 382/171 |
| 2016/0033935 A1* | 2/2016 | Seo | G03H 1/2286 |
| | | | 359/9 |
| 2016/0161740 A1 | 6/2016 | Bar-Zeev et al. | |
| 2017/0102545 A1 | 4/2017 | Hua et al. | |
| 2017/0236255 A1 | 8/2017 | Wetzstein et al. | |
| 2017/0293145 A1 | 10/2017 | Miller et al. | |
| 2017/0319051 A1 | 11/2017 | Kuriyama | |
| 2017/0345220 A1 | 11/2017 | Bates | |
| 2019/0026956 A1* | 1/2019 | Gausebeck | G06T 19/20 |
| 2019/0324271 A1 | 10/2019 | Lee et al. | |
| 2020/0004018 A1 | 1/2020 | Lee et al. | |
| 2020/0033615 A1 | 1/2020 | Kim et al. | |

OTHER PUBLICATIONS

Lee et al., "Compact three-dimensional head-mounted display system with Savart plate", Aug. 22, 2016, Optics Express, vol. 24, No. 17, 14 pages total.

* cited by examiner

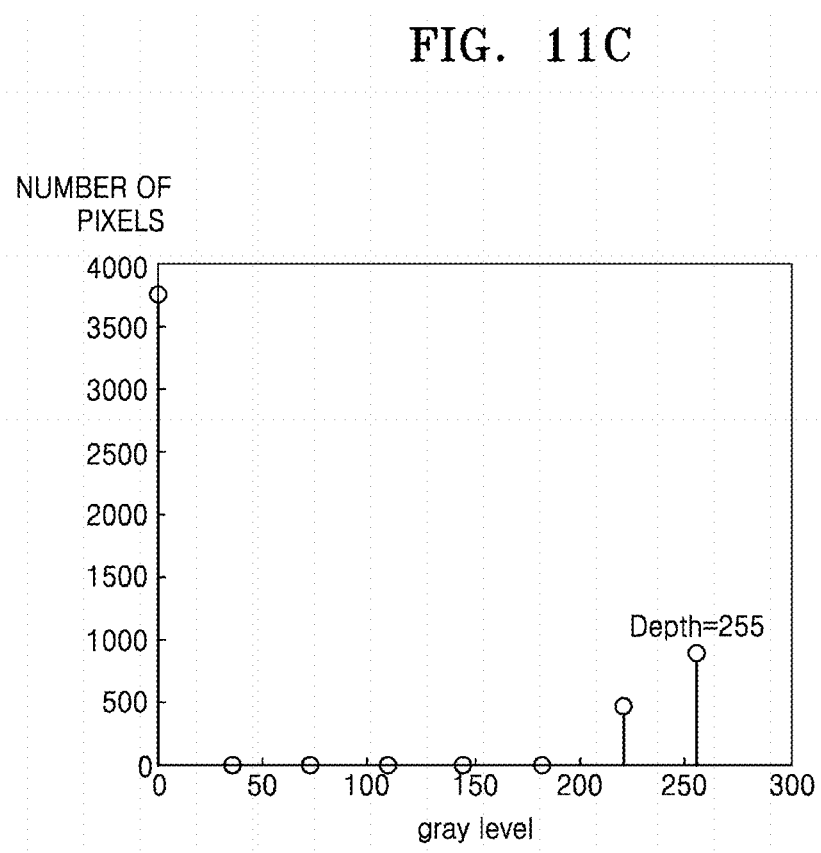

THREE-DIMENSIONAL IMAGE DISPLAY APPARATUS AND IMAGE PROCESSING METHOD

CROSS-REFERENCE TO RELATED APPLICATION

This application claims priority to Korean Patent Application No. 10-2018-0088671, filed on Jul. 30, 2018, in the Korean Intellectual Property Office, the disclosure of which is incorporated herein in its entirety by reference.

BACKGROUND

1. Field

Example embodiments consistent with the present disclosure relate to three-dimensional (3D) image display apparatuses and image processing methods.

2. Description of the Related Art

Recently, 3D image displaying techniques are being applied to various technical fields, including image display apparatuses related to virtual reality (VR) display and augmented reality (AR) display.

For example, a head-mounted display that provides VR is now in a stage of commercialization, and has been widely applied in the entertainment industry, and is further being developed into a form applicable to medical, educational, and industrial fields.

An AR display that is an advanced form of the VR display provides an image display apparatus combining the real world and VR, and has a characteristic that may bring out interactions between reality and virtuality. Interaction between reality and virtuality is based on a function of providing information about a real situation in real-time and may improve the reality effect by showing a virtual object or information superimposed on an environment of the real world.

In the related art AR display apparatuses and VR display apparatuses, a stereoscopy technique is generally used to display 3D images. Here, visual fatigue may be accompanied by the 3D image due to inconsistency between vergence and accommodation, and thus, a 3D image displaying method capable of expressing multiple depths has been researched.

SUMMARY

Provided are methods of extracting a representative depth that may be used in displaying multiple depths and 3D image display apparatuses using the methods.

Additional aspects will be set forth in part in the description which follows and, in part, will be apparent from the description, or may be learned by practice of the embodiments of the disclosure.

According to an aspect of the disclosure, there is provided a three-dimensional (3D) image display apparatus comprising: a processor configured to determine, from image data of a 3D image to be displayed, a representative depth value based on a current frame of the 3D image and a previous frame of the 3D image; and an imaging optical system configured to generate the 3D image in a predetermined space by modulating light based on the representative depth value.

The processor maybe further configured to: set a reference depth map based on a first depth map of the current frame a second depth map of the previous frame, generate a depth histogram of the reference depth map; and determine a depth value having high frequency in the depth histogram of the reference depth map as the representative depth value.

The processor maybe further configured to set the reference depth map by determining whether motion information exists for each pixel from the first depth map of the current frame and the second depth map of the previous frame.

The processor maybe further configured to: calculate a differential image value representing a difference in the depth value for each location between the first depth map of the current frame and the second depth map of the previous frame image, based on the differential image value satisfying a predetermined condition, set the first depth map of the current frame as the reference depth map, and based on the differential image value not satisfying the predetermined condition, determine a motion region depth map and set the motion region depth map as the reference depth map.

The processor maybe further configured to determine whether the differential image value satisfies the predetermined condition by determining whether a sum value obtained by adding differential image values of all pixels is less than a predetermined reference value.

The processor maybe further configured to set a result from multiplying the first depth map of the current frame by the differential image value as the motion region depth map.

The processor maybe further configured to determine the differential image value of a pixel of the 3D image as zero based on the differential image value of the pixel being less than a predetermined reference value.

The processor maybe further configured to determine the representative depth value by using a quantized depth value from the depth histogram of the reference depth map.

The processor maybe further configured to: set the representative depth value as zero, based on a frequency of a zero depth value being equal to or greater than a reference value in the depth histogram; and set the representative depth value as a depth value having a highest frequency from among depth values other than the zero depth value, based on the frequency of the zero depth value being less than the reference value.

The 3D image display apparatus may further comprises a memory configured to store a plurality of sets of reference image data and reference representative depth values selected from the reference image data as a database.

The processor maybe further configured to accumulate and store the image data and the representative depth value determined from the image data in the database of the memory.

The processor maybe further configured to learn a relationship between the reference image data and the reference representative depth by using the database as a learning data set, and determine the representative depth from the image data.

The imaging optical system may further comprise: a display device configured to modulate the light to generate the 3D image; and a varifocal optical system configured to focus the 3D image generated by the display device on a reference plane based on the representative depth value, wherein a focus of the varifocal optical system is adjustable to adjust a location of the reference plane.

The varifocal optical system may further comprise at least one lens provided along an optical axis to adjust a distance of the optical axis from the display device.

The varifocal optical system may further comprise at least one lens, and a curvature of a lens surface in the at least one lens is variable.

The processor maybe further configured to generate computer generated hologram (CGH) information by performing a fast Fourier transformation (FFT) operation only on a depth layer corresponding to the representative depth value in the image data, and the imaging optical system may further comprise a spatial light modulator configured to generate a hologram image by modulating light according to the CGH information.

The 3D image display apparatus maybe a wearable display apparatus.

According to another aspect of the disclosure, there is provided an image processing method performed by an apparatus comprising a processor executing computer-executable instructions, the image processing method comprising: determining, from image data of a three-dimensional (3D) image to be displayed, a representative depth value based on a current frame of the 3D image and a previous frame of the 3D image; and generating an image signal for generating the 3D image based on the representative depth value.

The determining of the representative depth value may comprise: setting a reference depth map based on a first depth map of the current frame and a second depth map of the previous frame; generating a depth histogram of the reference depth map; and determining the representative depth value as a depth value having high frequency in the depth histogram of the reference depth map.

The determining of the representative depth value may comprise extracting the representative depth value of input image data by using a database including a set of reference image data and a reference representative depth corresponding to the reference image data as learning data.

The image signal may include a varifocal signal to be supplied to a varifocal optical system to generate the 3D image in a predetermined space by modulating light based on the representative depth value, or a computer generated hologram (CGH) signal to be provided to a spatial light modulator to generate a hologram image by modulating light according to the CGH signal based on the representative depth value.

BRIEF DESCRIPTION OF THE DRAWINGS

The above and/or other aspects will become apparent and more readily appreciated from the following description of example embodiments, taken in conjunction with the accompanying drawings in which:

FIGS. 11A, 11B, and 11C are diagrams showing an example of extracting a representative depth from a still image and a depth value histogram according to the flowchart of FIG. 6;

DETAILED DESCRIPTION

Figure 1:
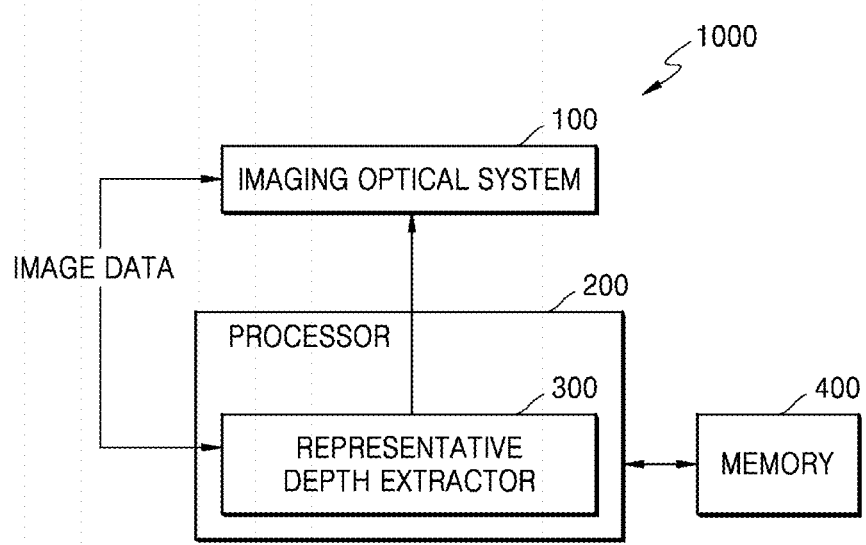
FIG. 1 is a block diagram of a 3D image display apparatus according to an example embodiment.

Example embodiments will now be described in detail with reference the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

In the drawings, like reference numerals denote like components, and sizes of components in the drawings may be exaggerated for convenience of explanation. The example embodiments of the disclosure are capable of various modifications and may be embodied in many different forms.

When a layer, a film, a region, or a panel is referred to as being "on" another element, it may be directly on the other layer or substrate, or intervening layers may also be present.

An expression used in the singular encompasses the expression of the plural, unless it has a clearly different meaning in the context. Throughout the specification, when a portion "includes" an element, another element may be further included, rather than excluding the existence of the other element, unless otherwise described.

As used herein, in particular, the "above" and the like used herein may be to indicate both the singular and the plural.

Also, the steps of all methods described herein may be performed in any suitable order unless otherwise indicated herein or otherwise clearly contradicted by context. The disclosure is not limited to the described order of the steps. The use of any and all examples, or example language (e.g., "such as") provided herein, is intended merely to better illuminate the disclosure and does not pose a limitation on the scope of the disclosure unless otherwise claimed.

Figure 2:
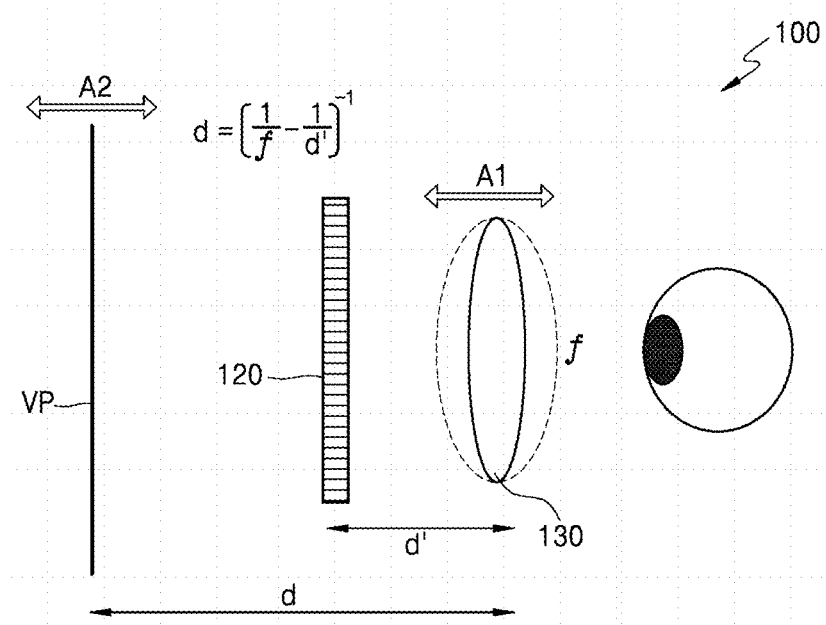
FIG. 2 is a diagram of an imaging optical system included in the 3D image display apparatus of FIG. 1 according to an example embodiment.
Figure 3:
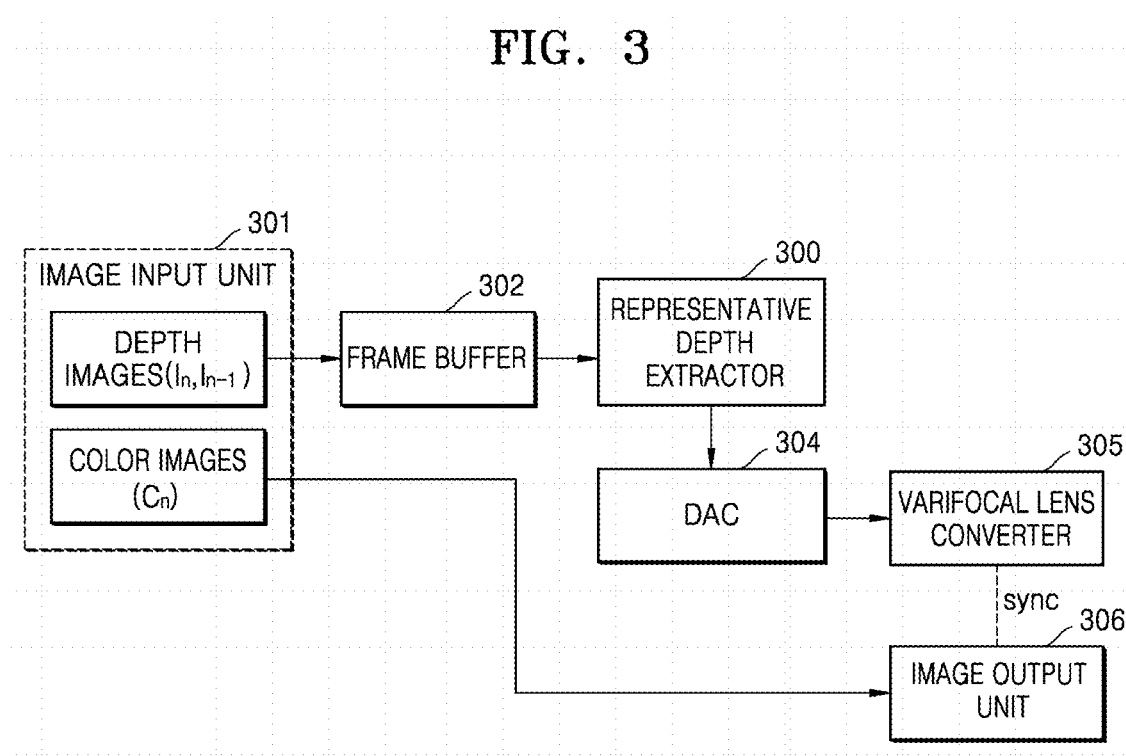
FIG. 3 is a block diagram for describing processes of displaying images in the 3D image display apparatus of FIG. 1 according to an example embodiment.

FIG. 1 is a block diagram of a 3D image display apparatus 1000 according to an example embodiment. FIG. 2 shows an exemplary configuration of an imaging optical system 100 included in the 3D image display apparatus 1000 of FIG. 1, and FIG. 3 is a block diagram illustrating processes of displaying images in the 3D image display apparatus 1000 of FIG. 1.

The 3D image display apparatus 1000 includes a processor 200 for extracting a representative depth from image data and an imaging optical system 100 for forming an image on a predetermined space by modulating light.

The image data is related to a 3D image to be displayed, and the processor 200 includes a representative depth extractor 300 for extracting a representative depth from the image data. The 3D image display apparatus 1000 may further include a memory 400 having source code for executing the representative depth extractor 300 stored therein.

The imaging optical system 100 refers to the extracted representative depth for forming an image.

The representative depth extractor 300 extracts the representative depth by analyzing depth information represented in a plurality of layers, in order to simplify processing of the image data including color information and depth information. A method of extracting the representative depth will be described in detail with reference to FIG. 4.

As shown in FIG. 2, the imaging optical system 100 includes a display device 120 for modulating light and a varifocal optical system 130 for focusing an image formed by the display device 120 and having a variable focus.

The display device 120 forms an image by modulating light according to 3D image information to be represented to an observer. The image formed by the display device 120 may include, for example, a stereo image respectively provided to the left and right eyes of the observer. For convenience of description, only an optical system for a single eye of the observer is shown in the drawings. The image formed by the display device 120 is not limited to the above example, and a hologram image, a light field image, an integral photography (IP) image, etc. may be formed, and moreover, a multi-view or super multi-view image may be formed.

The display device 120 may include, for example, a liquid crystal on silicon (LCoS) device, a liquid crystal display (LCD) device, an organic light-emitting diode (OLED) display device, a digital micromirror device (DMD), or a next generation display device such as micro LED, quantum dot (QD) LED, etc.

The imaging optical system 100 includes a light source for providing the display device 120 with light for forming the image, and moreover, may further include a beam splitter for adjusting an optical path, a relay lens for expanding or reducing an image, a spatial filter for removing noise, etc.

The varifocal optical system 130 displays an image at a plurality of depth locations, according to depth information included in the 3D image to be displayed. That is, the varifocal optical system 130 is provided for multi-depth representation, and visual fatigue may be reduced through the multi-depth representation. For example, in the case of a stereoscopy type in which the 3D image is recognizable by using parallax between the left and right eyes, a location of a virtual reference plane VP on which the left and right eye images are focused may vary depending on depth information included in the image to reduce the visual fatigue.

The varifocal optical system 130 focuses the image generated by the display device 120 on a predetermined virtual reference plane VP, and has a configuration of varying a focusing location f so that the location of the virtual reference plane VP may vary.

The varifocal optical system 130 may include one or more lenses. The one or more lenses may be configured to have a variable curvature or to move in an optical axis direction, for example, in a direction denoted by the arrow A1, and accordingly, the focal length f may vary and the location of the virtual reference plane VP on which the image is focused may vary in a direction denoted by the arrow A2.

The location of the virtual reference plane VP is determined by a focal length of the lens included in the varifocal optical system 130 and a distance d' between the display device 120 and the lens. The virtual reference plane VP may be formed a distance d from the lens included in the varifocal optical system 130. When a location of the lens included in the varifocal optical system 130 varies, the focal length of the lens does not change, but the distance d' from the display device 120 changes and the location of the virtual reference plane VP also changes.

When the curvature of the lens included in the varifocal optical system 130 varies, the distance d' between the display device 120 and the lens does not change, but the focal length of the lens changes and the location of the virtual reference plane VP also changes.

While only one lens of the varifocal optical system 130 is shown in the drawing for convenience of description, one or more lenses and a motor or an actuator for providing a driving power to move the one or more lenses or to change the curvature are also provided.

Referring to FIG. 3, the image data includes depth maps (depth images, $I_n$, $I_{n-1}$) and a color map (color image, $C_n$), where n denotes a frame number. That is, in order to extract a representative depth, the depth map $I_n$ of a current frame and the depth map $I_{n-1}$ of a previous frame are taken into account. According to an example embodiment, the image input unit 301 may receive the image data and the image data may be stored in a frame buffer 302.

The representative depth extractor 300 extracts a representative depth value by analyzing the image data. The extracted representative depth value is input to a digital-analog converter (DAC) 304 and a digital depth value is changed into an analog signal value. The analog signal value may be an electrical signal such as a current or a voltage for changing the curvature of the lens included in the varifocal optical system 130 or providing the lens with linearly moving power. The analog signal value is input as an input value of a varifocal lens converter 305 to change the focusing location of the lens included in the varifocal optical system 130. An image output unit 306 outputs the color value included in the image data, synchronizing the color value with an output of the varifocal lens converter. Accordingly, the image is displayed on the virtual reference plane VP determined by the representative depth value.

In the 3D image display apparatus 1000 according to the example embodiment, the image is formed on the virtual reference plane VP that is determined according to the location of the representative depth extracted by the representative depth extractor 300 with respect to one frame image. One representative depth location may be set with respect to one frame image. Alternatively, a plurality of representative depth locations may be set according to images. For example, when it is difficult to express the image only by using one representative depth, the plurality of representative depth locations may be set.

Unlike the example embodiment, if all layers regarding the depth information included in one image frame are represented, a configuration or an operation of a display system becomes complicated and a data processing amount also increases. For example, when one display device is used to display all layers regarding the depth information, the plurality of layers may be represented in synchronization with the focus changing of the varifocal optical system 130 in a time-sequential manner, that is, by a time-division method. In this case, a high-speed varifocal device and a display device that are in proportion to the number of layers are necessary. Alternatively, a spatial-division method may be used, but in this case, a plurality of display devices corresponding to the number of depth locations have to be provided, which results in an increase in the system size.

The 3D image display apparatus 1000 according to the example embodiment selects a representative depth and drives the varifocal optical system 130 so that a virtual reference plane may be formed at a location corresponding to the representative depth. Accordingly, a 3D image with reduced visual fatigue may be realized by using a simple configuration. Also, selection of the representative depth for representing the multi-depth is performed by analyzing the image, and thus, an eye tracking sensor for tracking a focusing location of the observer is not necessary and the system configuration may be simplified.

Figure 4:
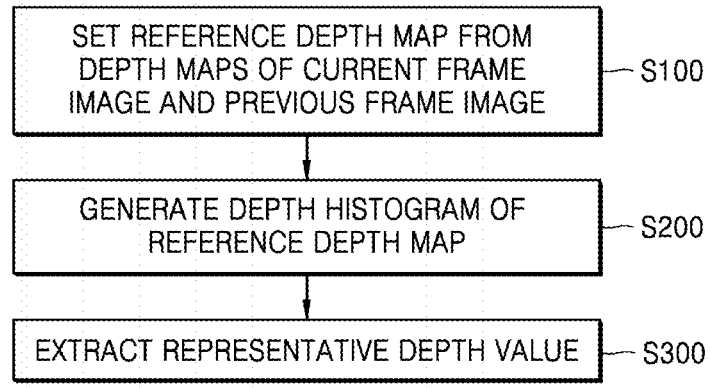
FIG. 4 is a flowchart illustrating processes of extracting a representative depth, the processes being performed by the 3D image display apparatus of FIG. 1 according to an example embodiment.

FIG. 4 is a flowchart illustrating processes of extracting a representative depth, performed by the 3D image display apparatus 1000 of FIG. 1 according to an example embodiment.

First, a reference depth map from which a representative depth is to be extracted is set based on a depth map of a current frame image and a depth map of a previous frame image (S100).

Next, a depth histogram of the reference depth map is generated (S200). The depth histogram is a graph showing frequencies of depth values granted to all pixels included in one frame image.

A representative depth value is extracted from the depth histogram of the reference depth map (S300).

Figure 5:
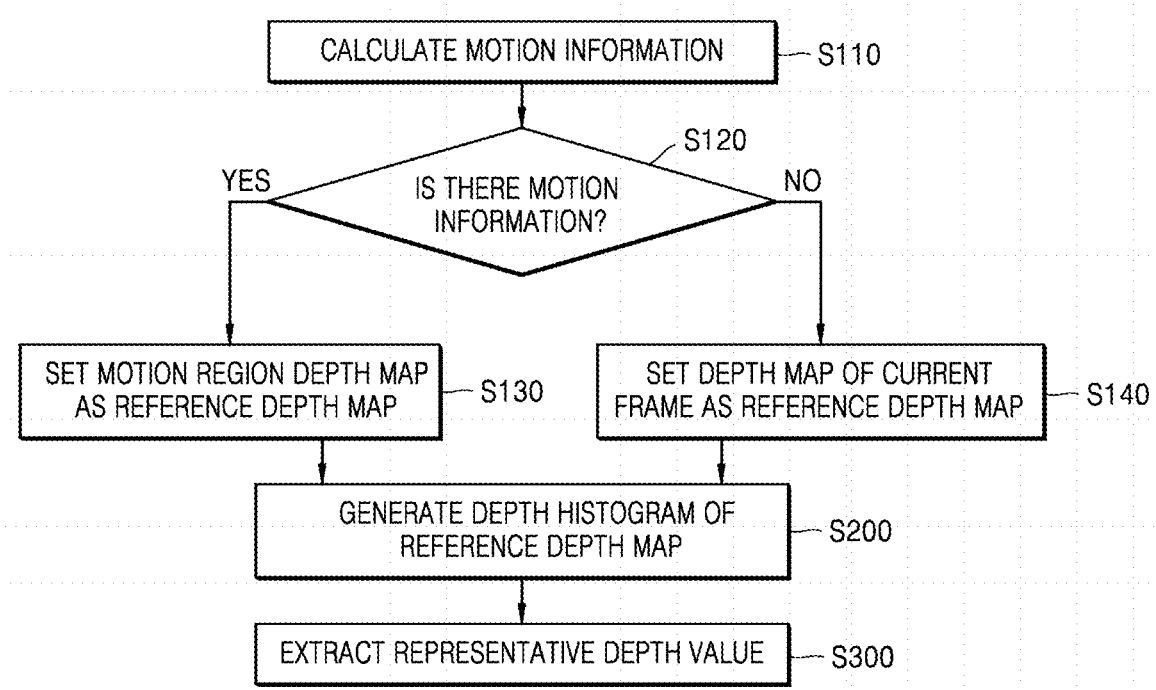
FIG. 5 is a flowchart illustrating another example of processes of extracting a representative depth according to an example embodiment.

FIG. 5 is a flowchart illustrating another example of processes of extracting a representative depth performed by the 3D image display apparatus of FIG. 1, and shows a process of setting a reference depth map in the flowchart of FIG. 4 in more detail.

In order to set the reference depth map, it may be analyzed whether there is motion information. In order to determine whether there is motion information, motion information may be calculated according to a predetermined rule (S110).

Next, it is determined whether there is motion information (S120). When there is motion information (S120—"YES"), a motion region depth map is generated and set as a reference depth map (S130). On the other hand, when there is no motion information (S120—"NO"), the depth map of the current frame is set as the reference depth map (S140).

Next, a depth histogram is generated with respect to the set reference depth map (S200), and then the representative depth value is extracted from the depth histogram (S300).

Figure 6:
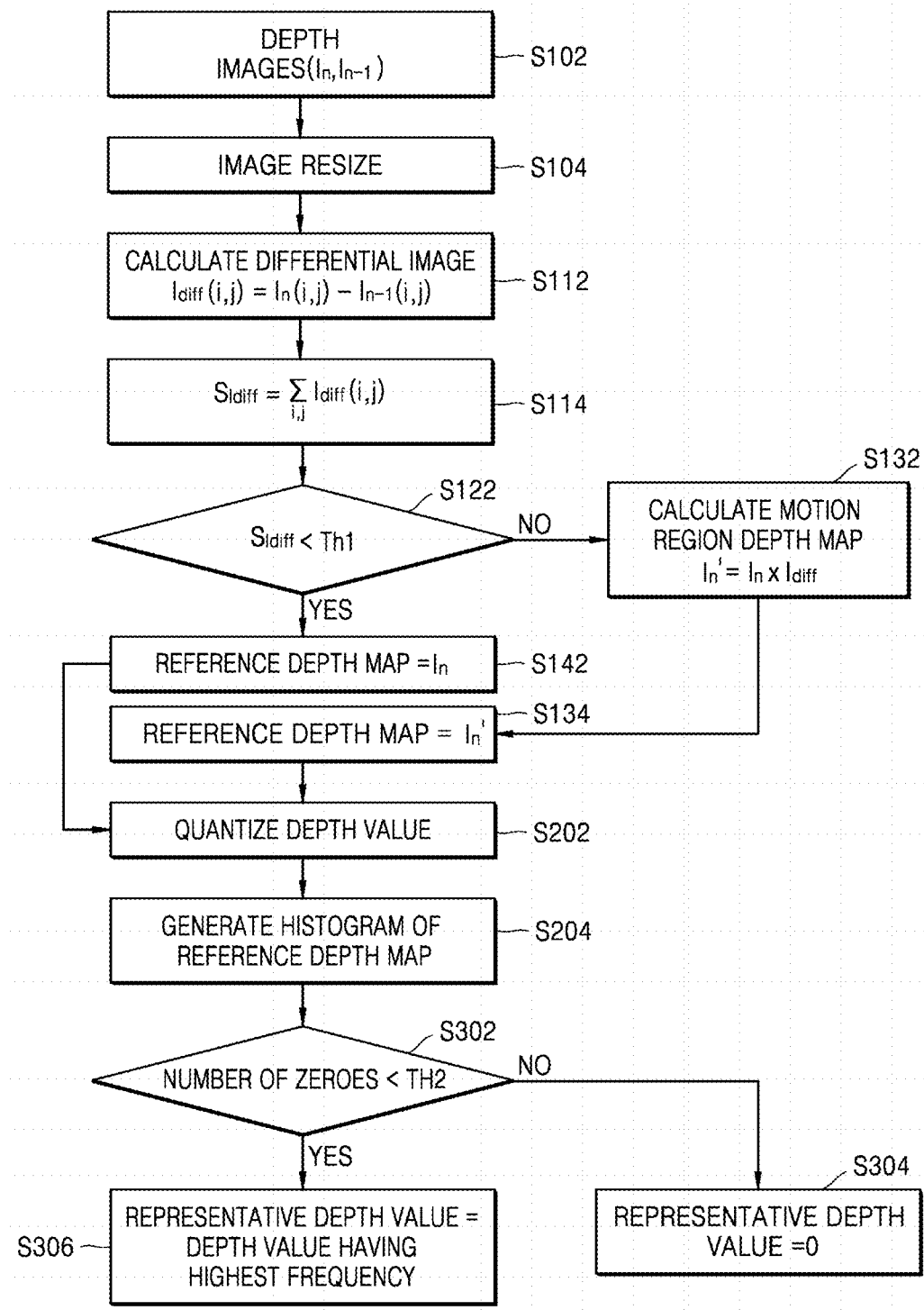
FIG. 6 is a flowchart illustrating another example of processes of extracting a representative depth according to an example embodiment.
Figure 7:
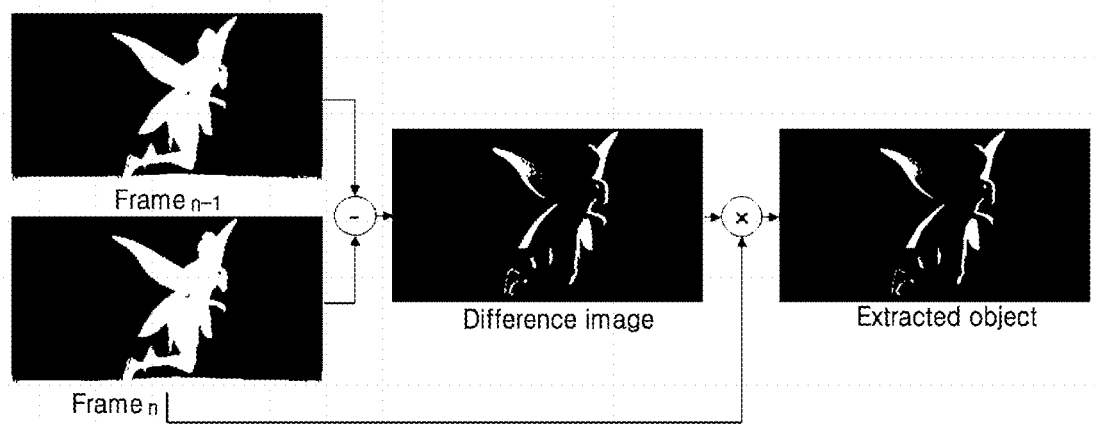
FIG. 7 is a diagram of an example of extracting a motion region depth map according to the flowchart of FIG. 6.
Figure 8:
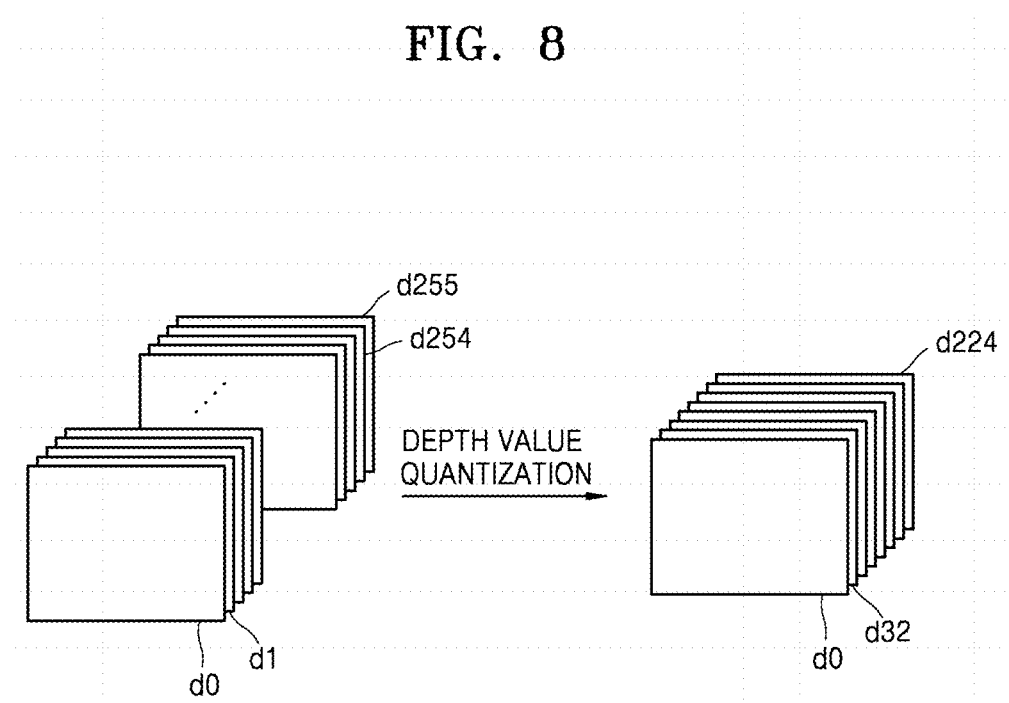
FIG. 8 is a diagram exemplarily illustrating a depth value quantization process in the flowchart of FIG. 6.

FIG. 6 is a flowchart illustrating another example of processes of extracting a representative depth performed by the 3D image display apparatus of FIG. 1, and illustrates detailed processes of the flowchart of FIG. 4. FIG. 7 is a conceptual diagram showing an example of extracting a motion region depth map according to the flowchart of FIG. 6, FIG. 8 is a conceptual diagram illustrating a depth value quantization process in the flowchart of FIG. 6, and FIG. 9 exemplarily shows a depth value histogram that uses quantized depth values according to the flowchart of FIG. 6.

In order to calculate motion information, a depth map $I_n$ of the current frame image and a depth map $I_{n-1}$ of the previous frame image may be used (S102).

Next, an image size may be adjusted (S104). However, this process is optional. Since relative depth values of pixels are compared with one another in order to analyze the motion information, an actual size may not be used, and instead, the image size may be reduced to reduce the amount of calculations.

Next, a differential image value $I_{diff}(i,j)$ that represents a difference between the depth values according to locations in the depth map of the current frame image and the depth map of the previous frame image is calculated (S112).

It may be determined whether there is motion information based on whether the differential image value $I_{diff(i,j)}$ satisfies a predetermined condition.

For example, a sum value $S_{Idiff}$ obtained by adding the differential image values with respect to all the pixels may be a reference of the predetermined condition according to an example embodiment. However, embodiments are not limited thereto.

After calculating the sum value (S114), it is determined whether the sum value is less than a predetermined reference value Th1 (S122).

When the sum value $S_{Idiff}$ is less than the predetermined reference value Th1 (S122—"YES"), it is determined that there is no motion information and the depth map $I_n$ of the current frame image is set as the reference depth map.

When the sum value $S_{Idiff}$ is equal to or greater than the predetermined reference value Th1 (S122—"NO"), a depth map $I_n'$ that is obtained by multiplying the depth map $I_n$ of the current frame image by the differential image value $I_{diff}$ is extracted as the motion region depth map (S132) and the motion region depth map is set as the reference depth map (S134).

The predetermined reference value Th1 may be appropriately set according to experience or knowledge of a person of ordinary skill in the art. According to an example embodiment, determination of whether there is motion information in a plurality of frame images included in a video may be made based on whether there is minimal motion as compared with images of other frames, instead of making the determination based on whether the image is a still image having no motion.

When the motion region depth map $I_n'$ is extracted, a pixel having the differential image value $I_{diff}$ that is less than a predetermined value may be processed as a value 0. Since the pixel having a relatively small differential image value $I_{diff}$ is a pixel having relatively small motion amount, the differential image value $I_{diff}$ that is less than the predetermined value may be processed as 0 to simplify whole calculations. The above predetermined value may be appropriately determined according to the experience or knowledge of a person of ordinary skill in the art. However, the calculation approximation is optional.

FIG. 7 shows an example of extracting the motion region depth map according to the above processes.

When the reference depth map is determined, the depth value histogram may be generated from the reference depth map (S204). Prior to this, a depth value quantization may be performed (S202).

Referring to FIG. 8, the depth information included in the 3D image may be expressed as, for example, 256 depth values of 8 bits. The depth value quantization denotes that some discontinuous values are selected from the 256 depth values as values for representing depth, not using all of the 256 values for representing depth. For example, from among depth values d0 to d255, eight depth values, that is, d0, d32, . . . , d224, may be selected. However, the above eight depth values are examples, and any value less than 256 may be selected. The depth value quantization as above is performed to reduce a fluctuation of the representative depth values selected from continuous frames, when, for example, the representative depth value is selected from all of the frames in order to represent a moving picture. Even in a case where the representative depth values of the continuous frames are different before the quantization, when the representative depth values are selected from among the quantized values, an identical representative depth value may be selected from the continuous frames. When the identical representative depth values are selected from the continuous frames, there is no need to drive, for example, the varifocal optical system 130, and thus, operations of the 3D image display apparatus 1000 may be simplified.

Figure 9:
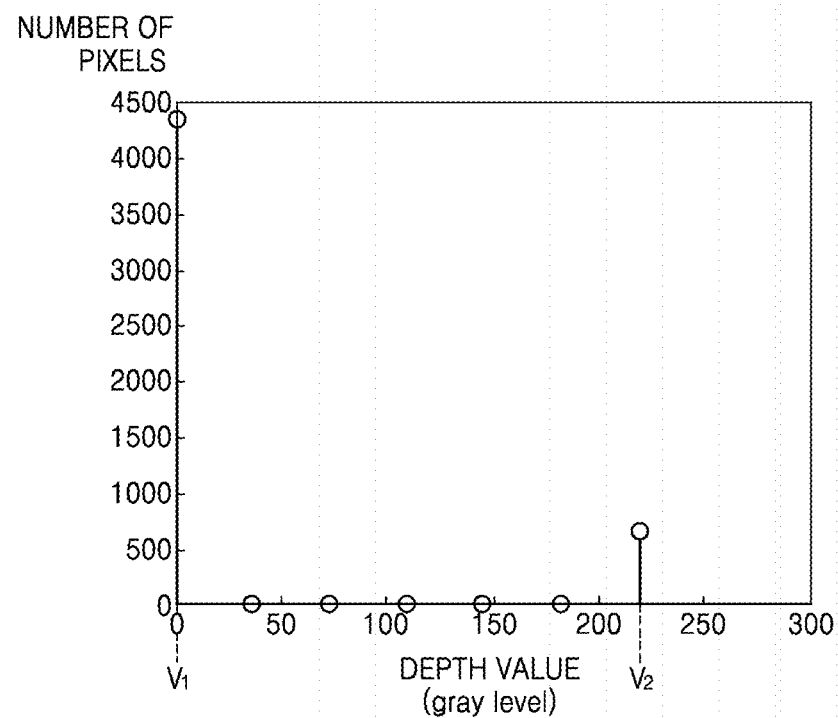
FIG. 9 is a diagram of an example of a depth value histogram using a quantized depth value according to the flowchart of FIG. 6.

FIG. 9 shows an exemplary depth histogram.

A transverse axis denotes the depth value, and a longitudinal axis denotes the number of pixels. The depth value is represented as eight quantized values, which may correspond to gray levels of FIG. 7. As the gray level is close to 0, the gray level is close to black.

From the depth histogram, a depth value having a high frequency may be extracted as the representative value. For example, a depth value having the highest frequency may be extracted as the representative depth value.

Here, the frequency in the case in which the depth value is 0 may be considered differently from the frequency of other depth values. It is because, for example, the value approximated from $I_{diff}$ in operation S132 is included in the above case. Therefore, a criterion of extracting the representative depth value may be differently set according to whether the number of the depth value 0 is less than a predetermined reference value Th2.

To do this, the frequency of the depth value 0 is checked, and it is checked whether the frequency is less than the predetermined reference value Th2 (S302).

When the frequency of the depth value 0 exceeds the predetermined reference value Th2, 0 is set as the representative depth value (S304).

When the frequency of the depth value 0 is less than the predetermined reference value Th2, a depth value having the highest frequency from among the depth values except the depth value 0 is selected as the representative depth value (S306).

Referring to FIG. 9, the frequency of the depth value 0 ($V_1$) in the graph is equal to or greater than the predetermined reference value Th2, the depth value 0 ($V_1$) is selected as the representative depth value. In the graph, the frequency of the depth value 0 is less than the predetermined reference value Th2, a depth value $V_2$ is selected as the representative depth value.

The predetermined reference value Th2 may be determined according to the experience and knowledge of a person of ordinary skill in the art, for example, a reference of approximating $I_{diff}$ as 0 may be considered to determine the predetermined reference value Th2.

The above detailed processes are exemplary, for example, the process of approximating $I_{diff}$ as 0 in operation S132 may be omitted, and the depth value having the highest frequency may be selected as the representative depth value without taking into account the frequency of the depth value 0 in the depth histogram.

Figure 10:
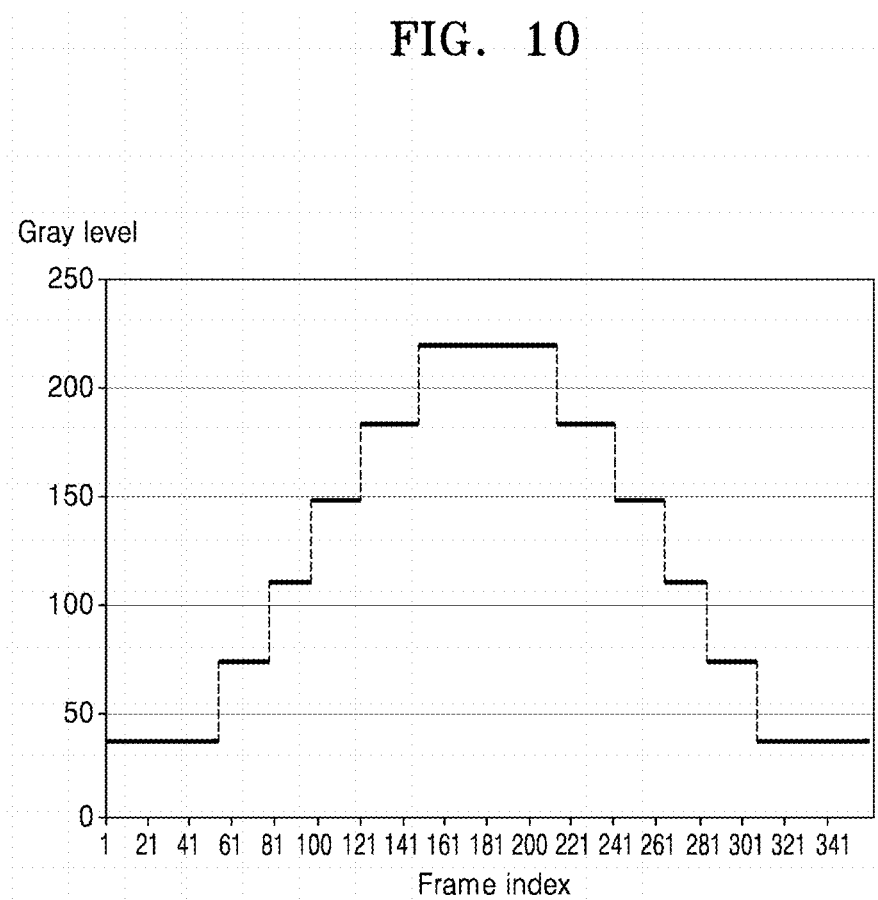
FIG. 10 is a diagram showing an example of extracting a representative depth with respect to a plurality of frame images constituting a video, according to the flowchart of FIG. 6.

FIG. 10 is a diagram showing an example of extracting a representative depth with respect to a plurality of frame images constituting a video, according to the flowchart of FIG. 6.

In the graph of FIG. 10, a transverse axis denotes a frame index and a longitudinal axis denotes a representative depth value calculated with respect to each frame. A video used in this experiment includes an object having depth values from a maximum depth value 255 to a minimum depth value 0 coming to a front portion of a user and going back to a rear portion of the user from a remote distance to a near distance according to time. As a result of applying a proposed algorithm, a representative depth value is appropriately extracted from each frame in the graph.

Figure 11A:
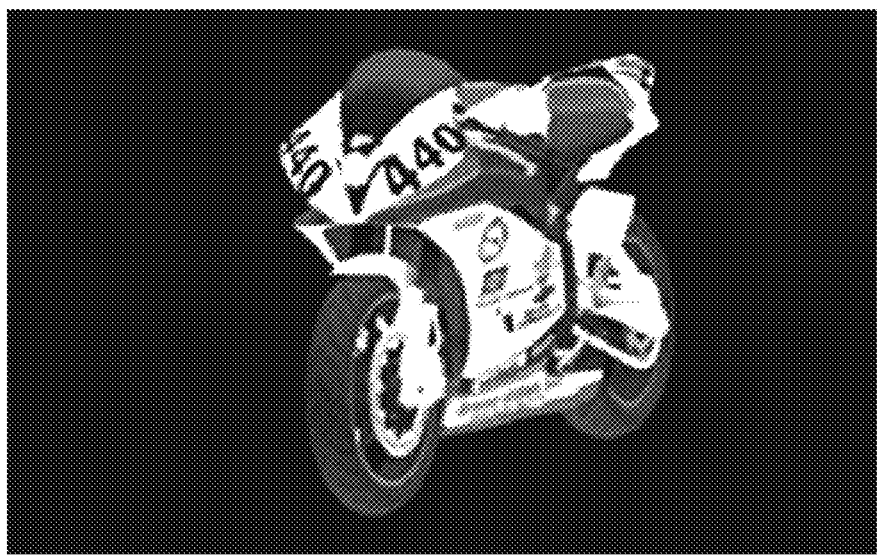
Figure 11B:
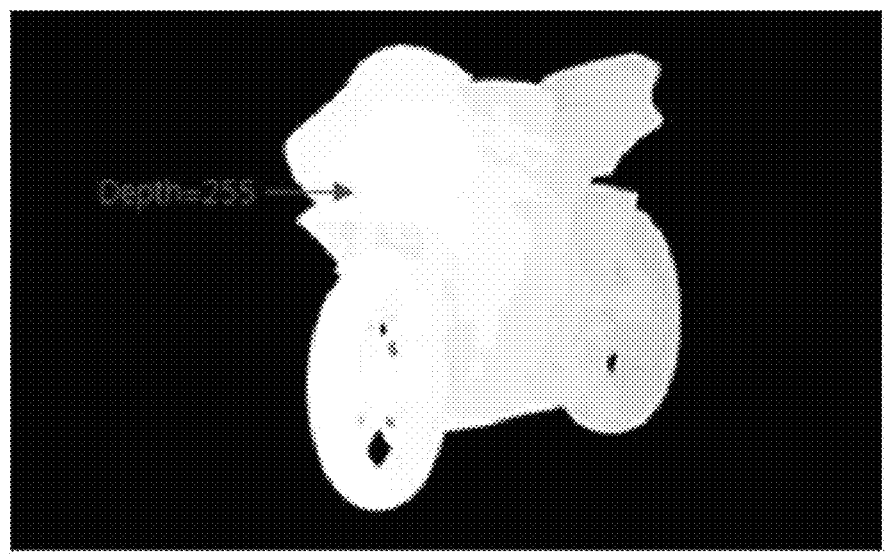

FIGS. 11A, 11B, and 11C are diagrams showing an example of extracting a representative depth from a still image and a depth value histogram according to the flowchart of FIG. 6.

FIGS. 11A and 11B show a color image and a depth map of a still image. FIG. 11C is a depth histogram generated based on FIG. 11B. In the graph of FIG. 11C, a transverse axis denotes a depth value represented as a gray level. The depth value corresponds to the gray level of FIG. 11B, and the gray level is close to black as the gray level gets close to 0. A longitudinal axis of FIG. 11C denotes the number of pixels. The depth value is expressed as eight quantized values.

In the histogram of FIG. 11C, the depth value 0 has the highest frequency that is less than a predetermined reference value, and thus, a depth value 255 having the highest frequency from among the depth values except the depth value 0 is selected as a representative depth value.

Figure 12:
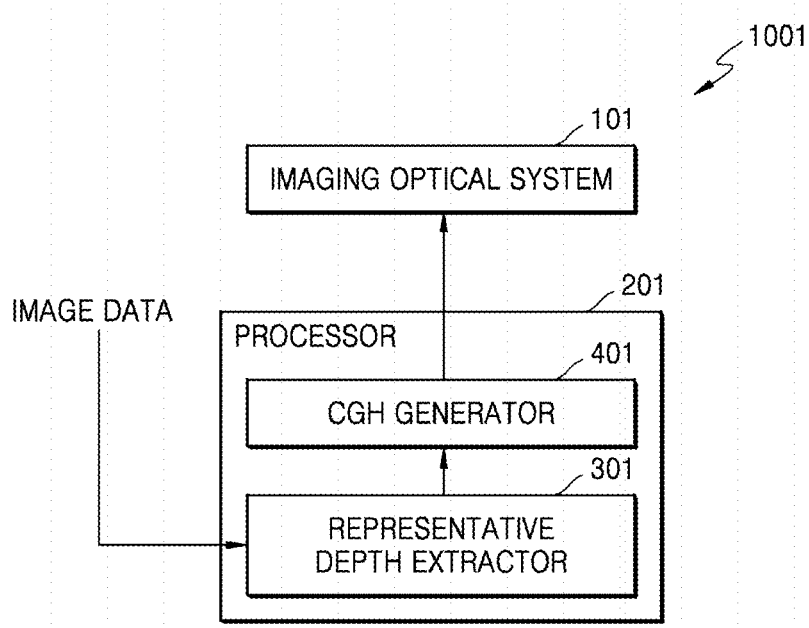
FIG. 12 is a block diagram of a 3D image display apparatus according to an example embodiment.
Figure 13:
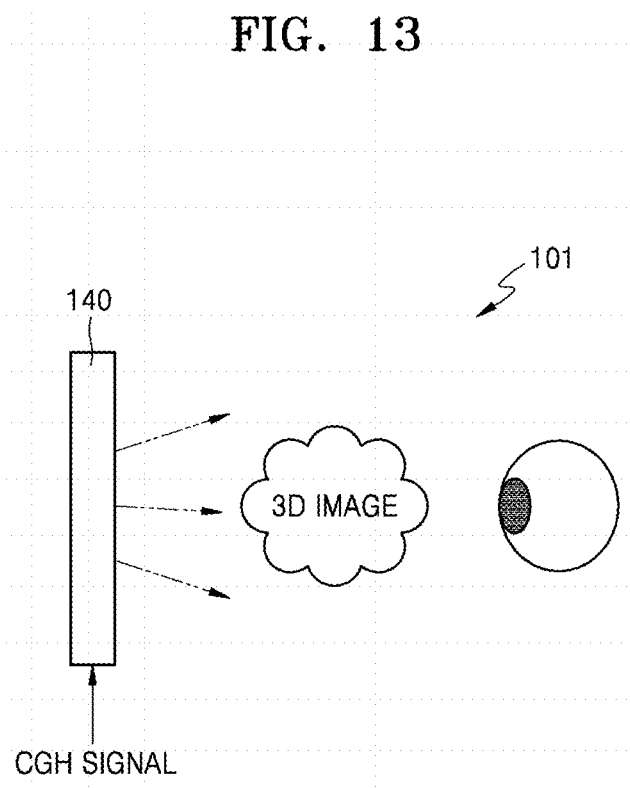
FIG. 13 is a diagram of an imaging optical system adopted in the 3D image display apparatus of FIG. 12 according to an example embodiment.
Figure 14:
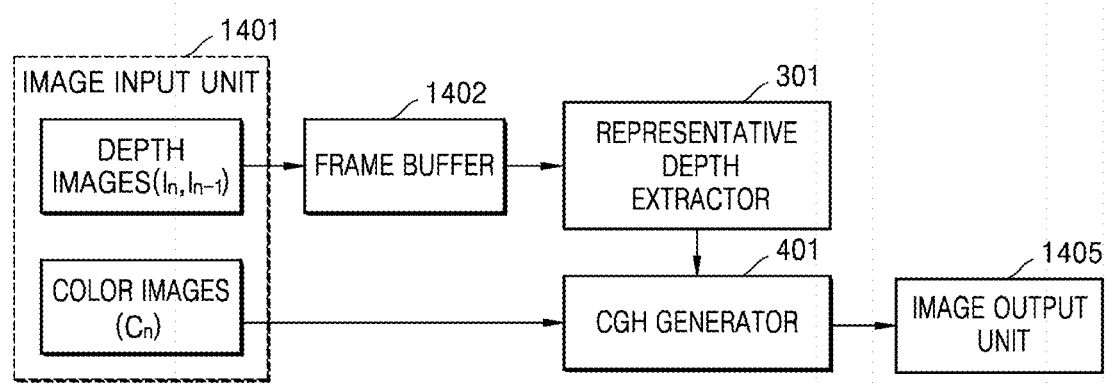
FIG. 14 is a block diagram for describing processes of displaying image in the 3D image display apparatus of FIG. 12 according to an example embodiment.

FIG. 12 is a block diagram of a 3D image display apparatus 1001 according to another example embodiment. FIG. 13 shows an exemplary configuration of an imaging optical system included in the 3D image display apparatus 1001 of FIG. 12, and FIG. 14 is a block diagram illustrating processes of displaying images in the 3D image display apparatus 1001 of FIG. 12.

The 3D image display apparatus 1001 includes a processor 201 for extracting a representative depth from image data and an imaging optical system 101 for forming an image on a predetermined space by modulating light.

The image data is related to a 3D image to be displayed, and the processor 201 includes a representative depth extractor 301 for extracting a representative depth from the image data and a computer generated hologram (CGH) generator 401 for calculating the CGH by using the extracted representative depth. The 3D image display apparatus 1001 may also include a memory, and source codes for executing the representative depth extractor 301 and the CGH generator 401 may be stored in the memory.

The imaging optical system 101 refers to the extracted representative depth for forming an image.

The representative depth extractor 301 extracts the representative depth by analyzing depth information represented in a plurality of layers, in order to simplify processing of the image data including color information and depth information. The method of extracting the representative depth is described above.

The 3D image display apparatus 1001 of the example embodiment is a hologram type image display apparatus and is different from the 3D image display apparatus 1000 using the varifocal optical system 130 shown in FIG. 1. That is, the processor 201 further includes the CGH generator 401 that performs a fast Fourier transformation (TTF) on a layer corresponding to the representative depth extracted by the representative depth extractor 301 to generate a CGH signal.

The imaging optical system 101 includes a spatial light modulator 140 that modulates light according to the CGH signal generated by the CGH generator 401 to form a hologram image.

In a hologram method, a principle that an object wave is reproduced when a reference wave is irradiated to a hologram that records an interference pattern of the object wave and the reference wave is used. Recently, a CGH has been used to form the interference pattern.

When the CGH signal is input to the spatial light modulator 140, light irradiated to the spatial light modulator 140 is modulated according to the CGH signal, and an object wave used to generate the CGH is reproduced so that an observer may recognize a 3D shape of the object generating the object wave.

A hologram value with respect to each position on a hologram plane is calculated in order to generate the CGH, and to do this, an FFT operation is performed on each layer so as to focus on all depth planes in a space. Since the CGH operation is performed for all the layers, the amount of operations is vast. The 3D image display apparatus according to the example embodiment applies the suggested representative depth extracting method to the hologram type display, that is, the FFT operation is only performed on a layer corresponding to the representative depth, and thus, the amount of operations may be greatly reduced.

Although not shown in the drawings, the imaging optical system 101 includes a light source for providing the spatial light modulator 140 with reference light related to the CGH signal, and moreover, may further include a field lens, etc. for focusing a hologram image on a predetermined spatial position, and a beam deflector that splits the hologram image into two directions towards the left and right eyes. FIG. 13 shows an optical system facing a single eye, for convenience of description.

Referring to FIG. 14, according to an example embodiment, the image input unit 1401 may receive the image data including depth maps (depth image, $I_n$, $I_{n-1}$) and a color map (color image, $C_n$) and the image data may be stored in a frame buffer 1402. Thereafter, the representative depth extractor 301 may analyze the depth maps $I_n$ and $I_{n-1}$ to extract a representative depth value.

The CGH generator 401 may generate a CGH signal by using the extracted representative depth value and the color map $C_n$. The generated CGH signal is input to an image output unit 1405 to reproduce a 3D image.

Figure 15A:
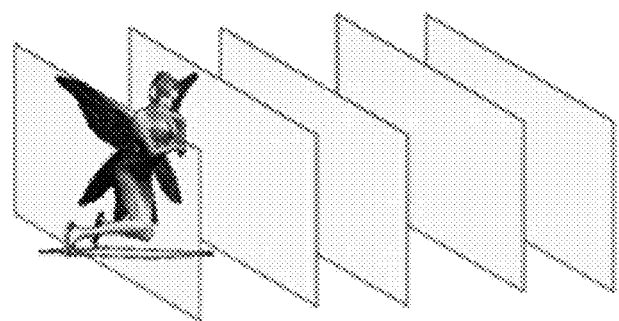
FIGS. 15A and 15B are diagrams showing that a hologram operation is performed by using differently setting representative depths according to images.
Figure 15B:
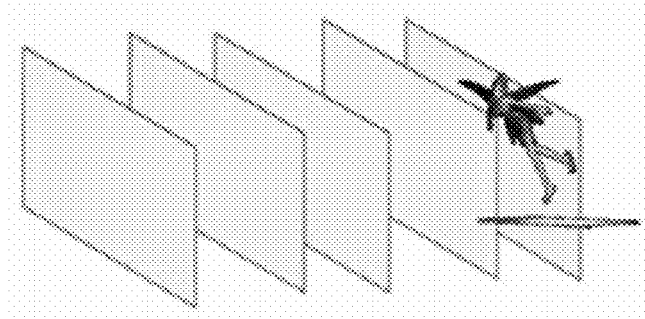

FIGS. 15A and 15B are conceptual diagrams showing that a hologram calculation is performed after differently setting representative depths according to images.

As shown in FIG. 15A, the CGH operation is performed only by using a first layer in an image in which an object protrudes forward, and as shown in FIG. 15B, the CGH operation may be performed only by using a last layer in an image in which the object depresses backward.

Figure 16:
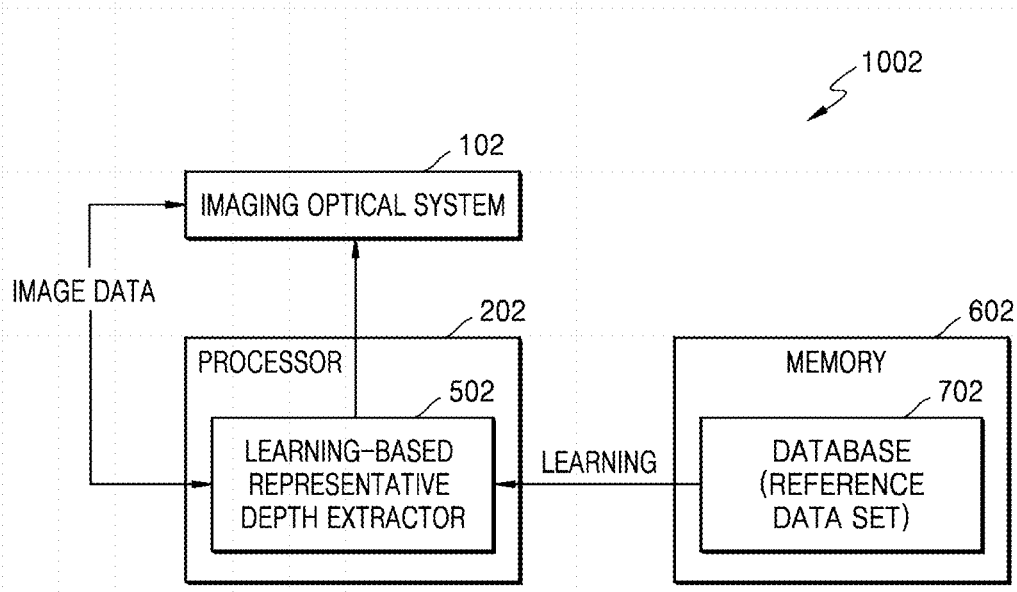
FIG. 16 is a block diagram of a 3D image display apparatus according to another example embodiment.

FIG. 16 is a block diagram of a 3D image display apparatus 1002 according to an example embodiment.

The 3D image display apparatus 1002 includes a processor 202 for extracting a representative depth from image data and an imaging optical system 102 for forming an image with reference to the extracted representative depth.

The 3D image display apparatus 1002 of the example embodiment is different from the 3D image display apparatuses described above, in that a representative depth is extracted based on learning.

The 3D image display apparatus 1002 includes a learning-based representative depth extractor 502 and a memory 602 storing a reference data set as a database 702. The memory 602 may store source codes for executing the learning-based representative depth extractor 502.

The reference data set may include a plurality of sets including reference image data and reference representative depth determined from the reference image data, and may be data reflecting a result of experiment performed on people, for example. Alternatively, the reference data set may include data reflecting various results of the above-described representative depth extracting method. Alternatively, the reference data set may include data reflecting results of analyzation taking into account saliency information.

The learning-based representative depth extractor 502 performs learning by using the database 702 as a training data set, and after that, may select the representative depth value by applying the result of learning to input image data. The learning-based representative depth extractor 502 may perform the learning based on a well-known deep learning algorithm.

The imaging optical system 102 may include the imaging optical system 100 including the varifocal optical system 130 or the hologram type optical system 101 as described above.

Figure 17:
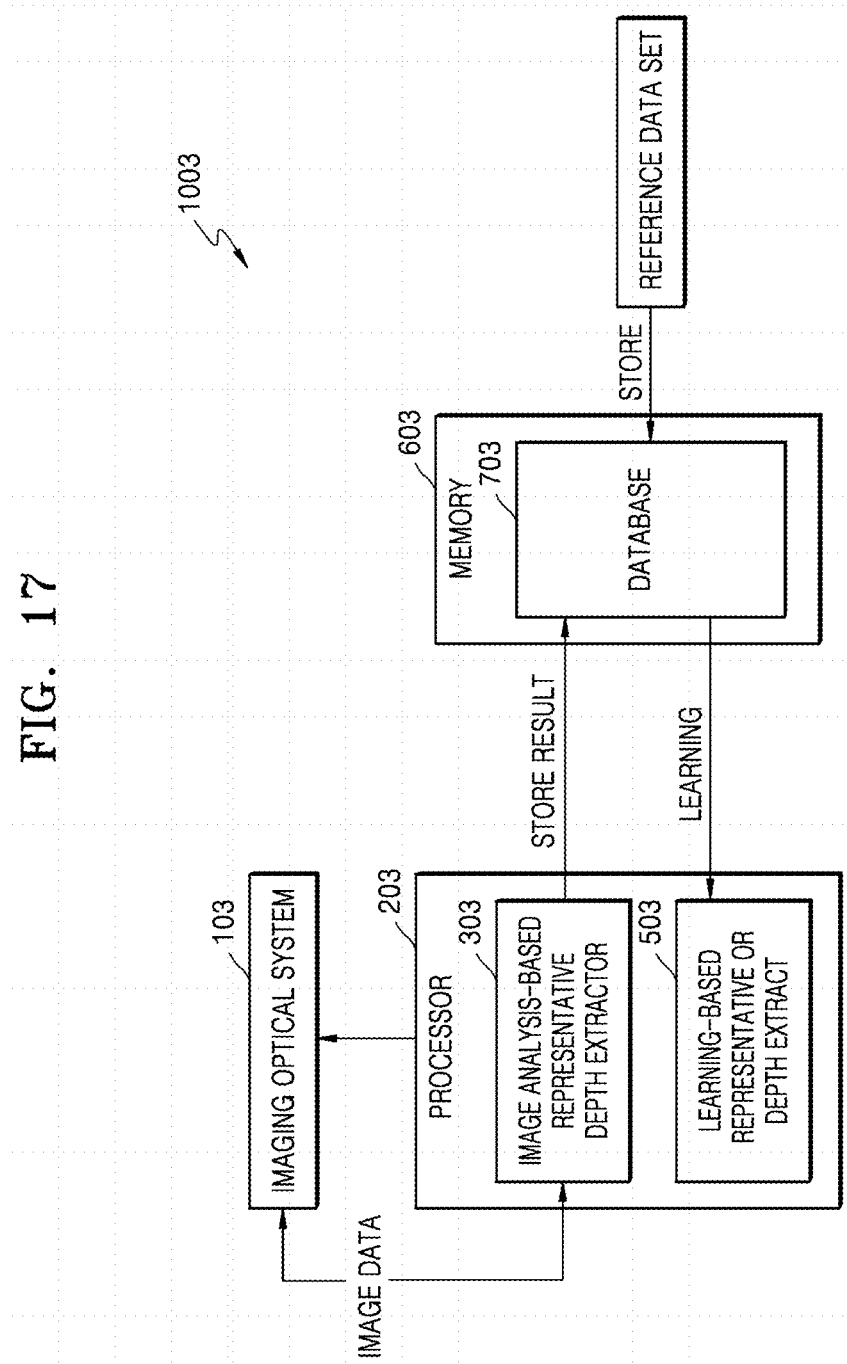
FIG. 17 is a block diagram of a 3D image display apparatus according to another example embodiment.

FIG. 17 is a block diagram of a 3D image display apparatus 1003 according to an example embodiment.

The 3D image display apparatus 1003 includes a processor 203 for extracting a representative depth from image data and an imaging optical system 103 for forming an image with reference to the extracted representative depth.

The imaging optical system 103 may include the imaging optical system 100 including the varifocal optical system 130 or the hologram type optical system 101 as described above.

The 3D image display apparatus 1003 according to the example embodiment is different from the 3D image display apparatus 1002 of FIG. 16, in view of including an image analysis-based representative depth extractor 303 and the learning-based representative depth extractor 503 for extracting the representative depth based on learning.

The database 703 stored in the memory 603 stores reference data set, and a result of executing the image analysis-based representative depth extractor 303 is accumulated every time of execution and stored as a data set. The memory 603 may also store source codes for executing the learning-based representative depth extractor 503 and the image analysis-based representative depth extractor 303.

The processor 203 may selectively execute the image analysis-based representative depth extractor 303 or the learning-based representative depth extractor 503 according to, for example, a user's selection or an input from another execution module.

The 3D image display apparatuses 1000, 1001, 1002, and 1003 may be configured as a wearable type. All or some components in the 3D image display apparatus may be configured as a wearable type.

For example, the 3D image display apparatuses 1000, 1001, 1002, and 1003 may be applied as head-mounted display (HMD) type. Also, one or more embodiments are not limited thereto, and the 3D image display apparatus may be applied as a glasses-type display or a goggle-type display.

The above-described 3D image display apparatuses 1000, 1001, 1002, and 1003 may be implemented as see-through type apparatuses capable of showing the image generated by the imaging optical systems 100, 101, 102, and 103 and an image of the real world together to the observer. To do this, the imaging optical systems 100, 101, 102, and 103 may include functional optical members allowing the image generated by the imaging optical systems 100, 101, 102, and 103 to proceed to the visual field of the observer and being transparent or semi-transparent with respect to real images.

When the real image is shown to the observer, the 3D image display apparatuses 1000, 1001, 1002, and 1003 may be applied to realize augmented reality (AR). AR may further improve the reality effect by combining the real world environment with a virtual object or virtual information. For example, additional information about the environment provided by the real world at the location of the observer may be generated by the imaging optical system and provided to the observer. The AR display may be applied to a ubiquitous environment or internet of things (IoT) environment.

The real world image is not limited to the real environment, but for example, may be an image generated by another imaging apparatus. Therefore, the 3D image display apparatuses 1000, 1001, 1002, and 1003 may be applied as multi-image display apparatuses capable of showing two kinds of images together.

The 3D image display apparatuses 1000, 1001, 1002, and 1003 may be linked or connected to another electronic device such as a smartphone, etc. For example, the processor driving the 3D image display apparatuses 1000, 1001, 1002, and 1003 may be included in a smartphone. Moreover, the 3D image display apparatuses 1000, 1001, 1002, and 1003 may be included in a smartphone in order to use the smartphone itself as a 3D image display apparatus.

Figure 18:
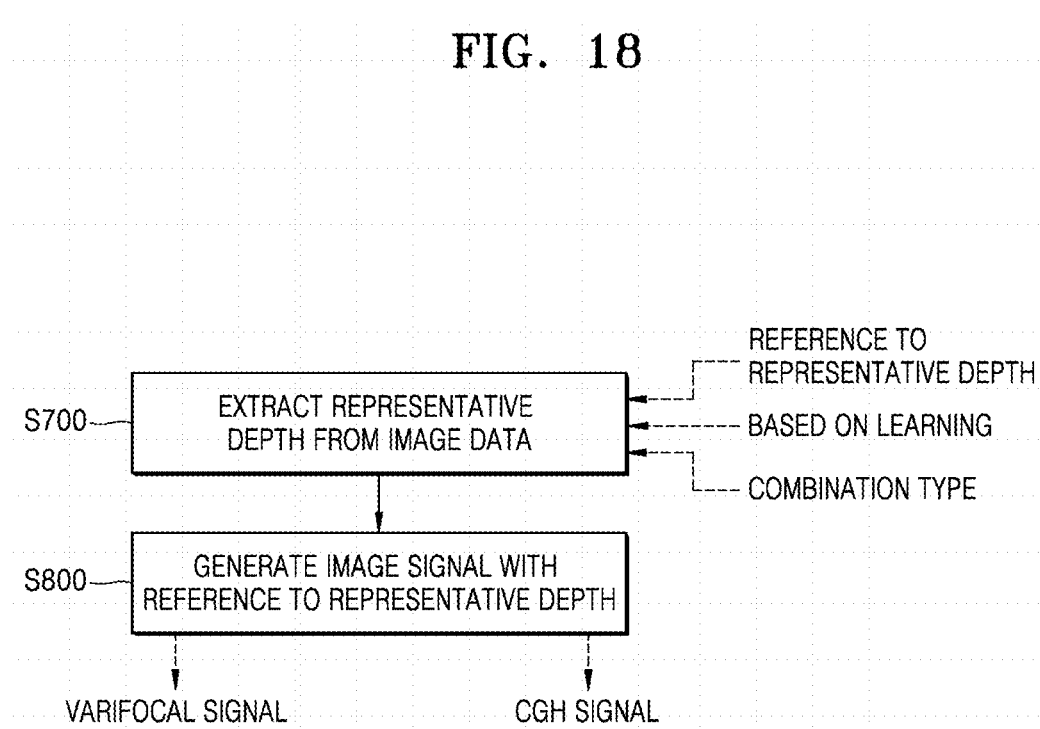
FIG. 18 is a flowchart for describing an image processing method according to an example embodiment.

FIG. 18 is a flowchart for describing an image processing method according to an example embodiment.

The image processing method according to the example embodiment is performed by an apparatus including a processor executing computer-executable instructions, and includes extracting a representative depth from image data related to a 3D image to be displayed (S700) and generating an image signal with reference to the extracted representative depth (S800).

In the extracting of the representative depth (S700), one of the representative depth extracting methods of the 3D image display apparatuses 1001, 1002, and 1003 described above or a combination thereof may be used.

For example, the representative depth extraction based on the image analysis, that is, a method of setting a reference depth map, from which the representative depth is to be extracted, between a depth map of a current frame image and a depth map of a previous frame image and extracting a depth value having high frequency from a depth histogram of the reference depth map as the representative depth, may be used.

Alternatively, the representative depth extraction based on learning, that is, a method of extracting a representative depth of input image data by using a database including a set of reference image data and a reference representative depth corresponding to the reference image data as learning data, may be used.

Alternatively, the above two methods may be both used, that is, results of image analysis are stored in a database and learning is performed by using the database, and then, the representative depth of an input image may be extracted.

The image signal may be a varifocal signal to be supplied to the varifocal optical system or a computer-generated hologram signal to be provided to the spatial light modulator.

The above image processing method may be implemented in the above 3D image display apparatuses 1000, 1001, 1002, and 1003, and moreover may be applied to various optical devices and electronic devices that may utilize the representative depth.

According to the 3D image display apparatus and the image processing method described above, the representative depth is extracted from each of continuous frame images and may be reflected to generate an image.

The extracted representative depth may be applied to focus variation of the varifocal optical system or calculation of a computer-generated hologram, operation of the 3D image display apparatus may be simplified, and a data processing amount may be reduced.

Since the representative depth extraction is performed based on the image analysis or learning, an additional eye tracking sensor is not necessary and the system configuration may be simplified.

The 3D image display apparatus may be easily applied to a wearable device, for example, a glasses-type AR display apparatus, etc.

It should be understood that example embodiments described herein should be considered in a descriptive sense only and not for purposes of limitation. Descriptions of features or aspects within each example embodiment should typically be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A three-dimensional (3D) image display apparatus comprising:
   a processor configured to determine, from image data of a 3D image to be displayed, a representative depth value based on a current frame of the 3D image and a previous frame of the 3D image; and
   an imaging optical system configured to generate the 3D image in a predetermined space by modulating light based on the representative depth value,
   wherein the processor is further configured to:
      calculate a differential image value representing a difference in a depth value for each location between a first depth map of the current frame and a second depth map of the previous frame,
      based on the differential image value satisfying a predetermined condition, set the first depth map of the current frame as a reference depth map, and
      based on the differential image value not satisfying the predetermined condition, determine a motion region depth map and set the motion region depth map as the reference depth map.

2. The 3D image display apparatus of claim 1, wherein the processor is further configured to:
   generate a depth histogram of the reference depth map; and
   determine a depth value having high frequency in the depth histogram of the reference depth map as the representative depth value.

3. The 3D image display apparatus of claim 2, wherein the processor is further configured to set the reference depth map by determining whether motion information exists for each pixel from the first depth map of the current frame and the second depth map of the previous frame.

4. The 3D image display apparatus of claim 1, wherein the processor is further configured to determine whether the differential image value satisfies the predetermined condition by determining whether a sum value obtained by adding differential image values of all pixels is less than a predetermined reference value.

5. The 3D image display apparatus of claim 1, wherein the processor is further configured to set a result from multiplying the first depth map of the current frame by the differential image value as the motion region depth map.

6. The 3D image display apparatus of claim 5, wherein the processor is further configured to determine the differential image value of a pixel of the 3D image as zero based on the differential image value of the pixel being less than a predetermined reference value.

7. The 3D image display apparatus of claim 2, wherein the processor is further configured to determine the representative depth value by using a quantized depth value from the depth histogram of the reference depth map.

8. The 3D image display apparatus of claim 2, wherein the processor is further configured to:
set the representative depth value as zero, based on a frequency of a zero depth value being equal to or greater than a reference value in the depth histogram; and
set the representative depth value as a depth value having a highest frequency from among depth values other than the zero depth value, based on the frequency of the zero depth value being less than the reference value.

9. The 3D image display apparatus of claim 1, further comprising a memory configured to store a plurality of sets of reference image data and reference representative depth values selected from the reference image data as a database.

10. The 3D image display apparatus of claim 9, wherein the processor is further configured to accumulate and store the image data and the representative depth value determined from the image data in the database of the memory.

11. The 3D image display apparatus of claim 9, wherein the processor is further configured to learn a relationship between the reference image data and the reference representative depth values by using the database as a learning data set, and determine the representative depth value from the image data.

12. The 3D image display apparatus of claim 1, wherein the imaging optical system comprises:
a display device configured to modulate the light to generate the 3D image; and
a varifocal optical system configured to focus the 3D image generated by the display device on a reference plane based on the representative depth value, wherein a focus of the varifocal optical system is adjustable to adjust a location of the reference plane.

13. The 3D image display apparatus of claim 12, wherein the varifocal optical system further comprises at least one lens provided along an optical axis to adjust a distance of the optical axis from the display device.

14. The 3D image display apparatus of claim 12, wherein the varifocal optical system further comprises at least one lens, and a curvature of a lens surface in the at least one lens is variable.

15. The 3D image display apparatus of claim 1, wherein the processor is further configured to generate computer generated hologram (CGH) information by performing a fast Fourier transformation (FFT) operation only on a depth layer corresponding to the representative depth value in the image data, and
wherein the imaging optical system comprises a spatial light modulator configured to generate a hologram image by modulating light according to the CGH information.

16. The 3D image display apparatus of claim 1, wherein the 3D image display apparatus is a wearable display apparatus.

17. An image processing method performed by an apparatus comprising a processor executing computer-executable instructions, the image processing method comprising:
determining, from image data of a three-dimensional (3D) image to be displayed, a representative depth value based on a current frame of the 3D image and a previous frame of the 3D image; and
generating an image signal for generating the 3D image based on the representative depth value,
wherein the determining of the representative depth value comprises:
calculating a differential image value representing a difference in a depth value for each location between a first depth map of the current frame and a second depth map of the previous frame,
based on the differential image value satisfying a predetermined condition, setting the first depth map of the current frame as a reference depth map, and based on the differential image value not satisfying the predetermined condition,
determining a motion region depth map and setting the motion region depth map as the reference depth map.

18. The image processing method of claim 17, wherein the determining of the representative depth value further comprises:
generating a depth histogram of the reference depth map; and
determining the representative depth value as a depth value having high frequency in the depth histogram of the reference depth map.

19. The image processing method of claim 17, wherein the determining of the representative depth value comprises extracting the representative depth value of input image data by using a database including a set of reference image data and a reference representative depth corresponding to the reference image data as learning data.

20. The image processing method of claim 17, wherein the image signal includes a varifocal signal to be supplied to a varifocal optical system to generate the 3D image in a predetermined space by modulating light based on the representative depth value, or a computer generated hologram (CGH) signal to be provided to a spatial light modulator to generate a hologram image by modulating light according to the CGH signal based on the representative depth value.

* * * * *